United States Patent [19]

Duprez et al.

[11] 4,280,655

[45] Jul. 28, 1981

[54] AUTOMOTIVE THERMOSTATIC VALVE

[75] Inventors: Wayne R. Duprez, Waltham; Backman Wong, Wayland, both of Mass.

[73] Assignee: Standard-Thomson Corporation, Waltham, Mass.

[21] Appl. No.: 152,381

[22] Filed: May 22, 1980

Related U.S. Application Data

[63] Continuation of Ser. No. 4,149, Jan. 17, 1979, abandoned.

[51] Int. Cl.$^3$ ............................................. F01P 7/02
[52] U.S. Cl. .................. 236/34.5; 251/358; 251/361
[58] Field of Search .............. 236/34, 34.5, 100; 251/358, 361, 363

[56] References Cited

U.S. PATENT DOCUMENTS

| | | | |
|---|---|---|---|
| 1,826,160 | 10/1931 | Woolson et al. | 236/34 |
| 2,065,148 | 12/1936 | Mallinger | 236/34.5 |
| 2,249,576 | 7/1941 | Payne | 236/34.5 |
| 2,769,454 | 11/1956 | Bletcher et al. | 251/358 X |
| 2,833,478 | 5/1958 | middleton | 236/34.5 X |
| 2,982,477 | 5/1961 | Drapeau | 236/34.5 |
| 3,129,885 | 4/1964 | Freismuth | 236/34.5 |
| 3,233,861 | 2/1966 | Stillwagon | 251/358 X |
| 3,893,618 | 7/1975 | Wong et al. | 236/34.5 X |

Primary Examiner—William E. Tapolcai, Jr.
Attorney, Agent, or Firm—Jacox & Meckstroth

[57] ABSTRACT

An automotive thermostatic valve which comprises a stationary portion and a movable portion. The stationary portion comprises a rigid frame member which includes a central portion and an outer annular portion. The outer annular portion is joined to the central portion by radially extending spokes. The outer annular portion of the rigid frame member is covered with a body of elastomeric material which is shaped to provide a valve seat surface for engagement by the movable portion of the valve and is also shaped to provide a securing region which is clamped within a fluid conduit within which the valve is positioned. The outer annular portion of the rigid frame member has a radial portion adjacent the valve seat surface of the body of elastomeric material for support thereof and a cylindrical portion adjacent the securing region of the body of elastomeric material for support and reinformcement thereof during clamping thereof within a fluid conduit within which the valve is positioned.

6 Claims, 3 Drawing Figures

AUTOMOTIVE THERMOSTATIC VALVE

RELATED APPLICATION

This application is a continuation of application Ser. No. 004,149, filed Jan. 17, 1979, now abandoned.

BACKGROUND OF THE INVENTION

A thermostatic fluid control valve is positioned in the cooling system of an internal combustion engine and controls the volume of fluid flow to a radiator or heat exchanger, as fluid circulates in the cooling system. Thus, the fluid control valve maintains the coolant fluid at a desired temperature.

A stationary portion of the thermostatic fluid control valve is secured within a conduit of the cooling system. Conventionally, the stationary portion is a machined part which is relatively expensive, because a high degree of accuracy is required. In many types of installations, there is difficulty in preventing leakage of fluid between the stationary portion and the conduit and/or between the stationary portion and a movable portion when the valve is in the closed condition. When a conventional thermostatic fluid control valve is installed in the cooling system of an internal combustion engine, it is necessary to install a gasket between the stationary portion of the thermostatic fluid control valve and the portion of the conduit system within which the thermostatic valve is installed. Such a gasket is an element of expense and requires time in the installation thereof.

It is an object of this invention to provide an automotive thermostatic valve which has a movable portion and a stationary portion and in which no machining of the major part of the stationary portion is required.

It is another object of this invention to provide a thermostatic fluid control valve which may be installed within the cooling system of an internal combustion engine without the use of a gasket or the like.

It is another object of this invention to provide such an automotive thermostatic valve through which there is no leakage.

It is another object of this invention to provide a stationary valve member which readily replaces a machined stationary valve member, such as the stationary valve member shown in U.S. Pat. No. 3,893,618, or which may replace the stationary valve member in any one of numerous types of automotive thermostatic valve devices.

It is another object of this invention to provide such an automotive thermostatic valve in which the stationary valve portion thereof has an elastomeric valve seat surface which is firmly supported, but which is readily deformed in seating action and in sealing action as a result of engagement by the movable valve member.

It is another object of this invention to provide an automotive thermostatic valve which is relatively light in weight in consideration of its physical size.

It is another object of this invention to provide an automotive thermostatic valve which has a stationary valve seat member which includes a sheet metal element which serves as a support element or reinforcement element for an elastomeric body portion of the stationary valve seat member, to prevent undue distortion of the elastomeric material.

SUMMARY OF THE INVENTION

An automotive thermostatic valve of this invention comprises a stationary valve member having an annular valve seat portion forming a fluid port and a linearly movable valve member having a closure portion normally engaging the valve seat portion, the movable valve member being movable with respect to the valve seat portion. The stationary valve member comprises a structural frame of rigid material, such as sheet metal, or the like. The frame has an annular central portion which is joined to an annular outer portion by a plurality of radially extending spokes. The annular outer portion is covered by elastomeric material which is molded thereupon to provide a body of a desired shape, having a securing portion and a valve seat portion. The stationary valve member is clamped or otherwise secured within a conduit of a cooling system, without the use of gaskets or the like. However, because the stationary valve member is of elastomeric material, there is no leakage of fluid between the stationary valve member and the conduit. Furthermore, when the movable valve member is in engagement with the valve seat portion of the stationary valve member, the movable valve member is in engagement with elastomeric material, and there is no leakage between the stationary valve member and the movable valve member. Thus, a very effective stationary valve member is produced at relatively low costs.

DETAILED DESCRIPTION OF THE INVENTION

Figure 1:
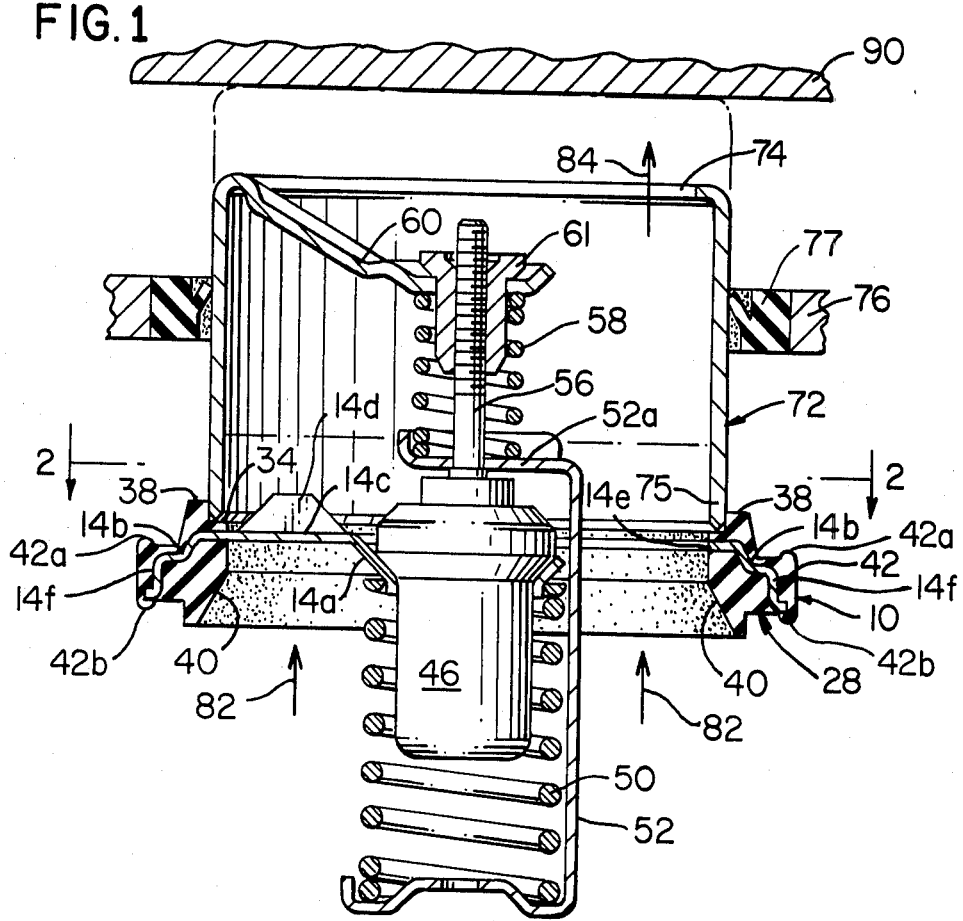
FIG. 1 is a longitudinal sectional view of an automotive thermostatic valve of this invention, showing the movable valve member in one position thereof and also illustrating another position thereof.
Figure 2:
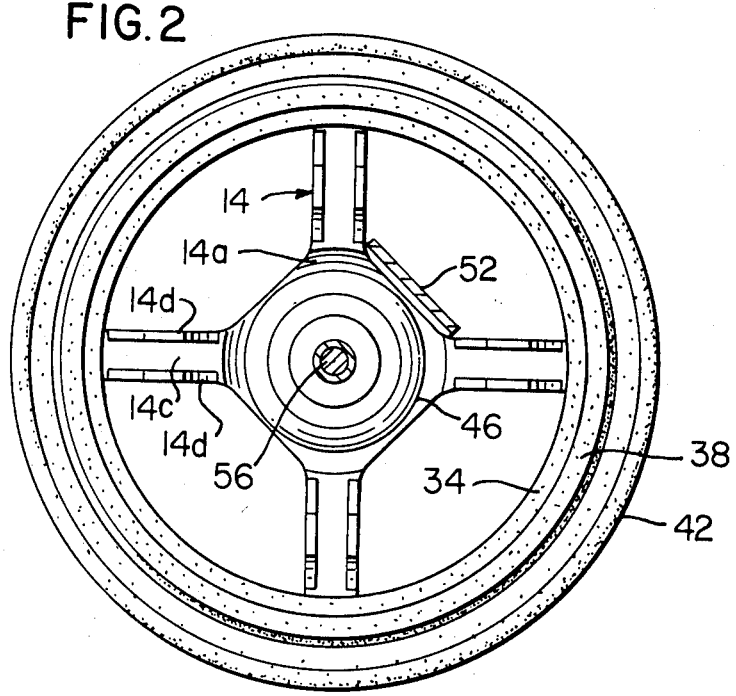
FIG. 2 is a sectional view, taken substantially on line 2—2 of FIG. 1, with the movable valve member in said other position thereof illustrated in FIG. 1.

An automotive thermostatic valve of this invention comprises a stationary valve member 10 which includes a rigid frame 14. The rigid frame 14 may be of any suitable rigid material, such as sheet metal or the like. The rigid frame 14 has a central annular portion 14a with a plurality of spokes 14c extending radially therefrom to an annular support portion 14e. Each of the spokes 14c is shown herein as optionally having a plurality of laterally extending strengthener portions 14d. The rigid frame 14 has an outwardly and angularly extending annular portion 14b which joins the annular support portion 14e to a cylindrical reinforcing portion 14f.

The portions 14e, 14b, and 14f are covered by an annular body 28 of elastomeric material which forms a fluidport. The elastomeric material may be rubber, synthetic rubber, plastics material or the like. The annular body 28 of elastomeric material is molded to a desired shape upon and is bonded to the portions 14e, 14b, and 14f of the rigid frame 14. The annular body 28 of elastomeric material has an annular valve seat surface 34 which is shown herein as being encompassed by an annular flange 38. The annular flange 38 has a cylindrical wall 39 which extends from the annular valve seat surface 34, substantially normal thereto. The annular valve seat surface 34 is closely adjacent the annular support portion 14e of the rigid frame 14. Thus, the annular valve seat surface 34 has firm support while retaining resilient characteristics.

Shown in spaced relationship below the annular valve seat surface 34, the annular body 28 of elastomeric material has an inclined surface 40 which directs fluid flow into the fluid port formed by the annular body 28 of elastomeric material.

Figure 3:
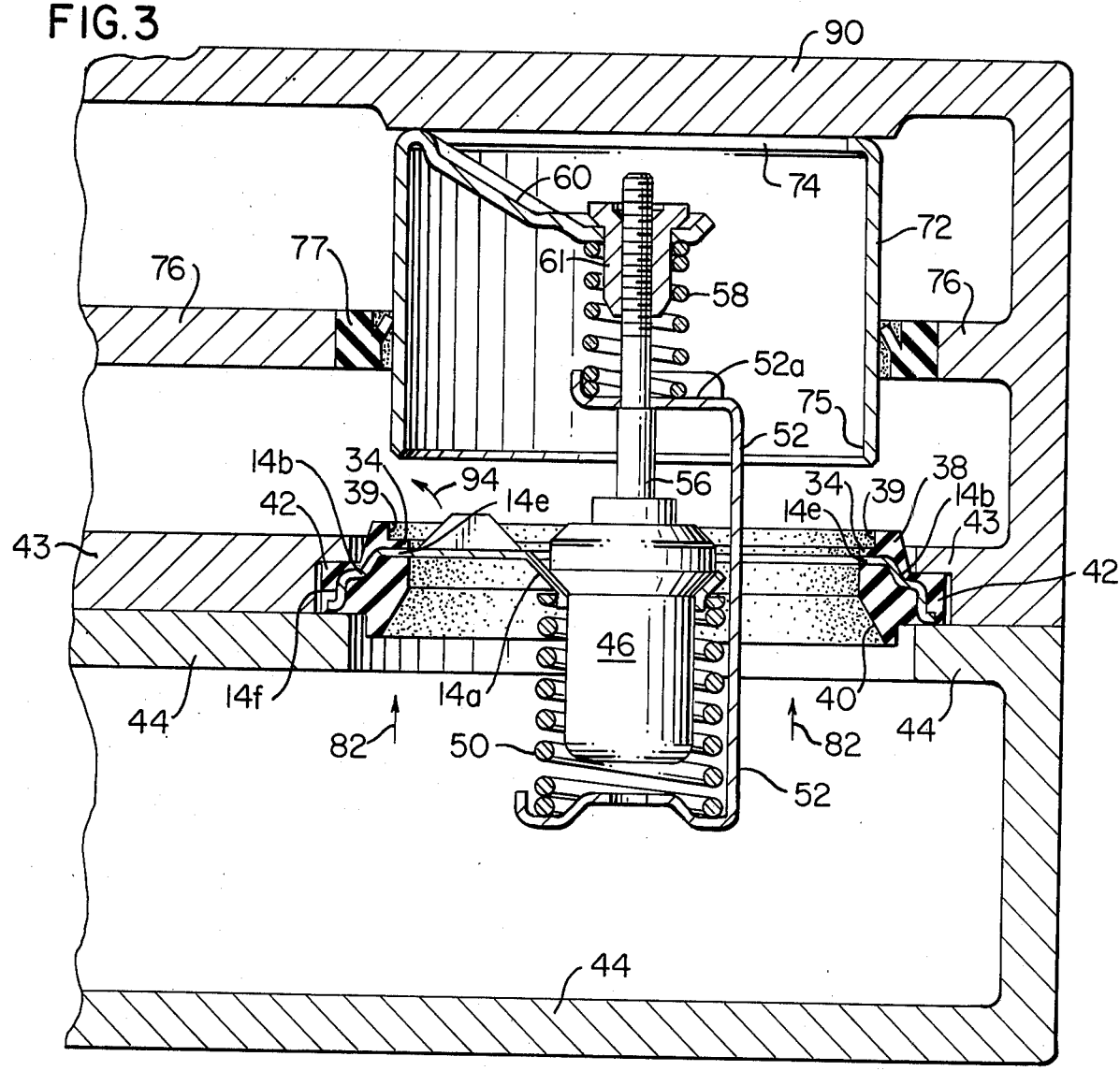
FIG. 3 is a sectional view similar to FIG. 1, drawn on substantially the same scale as FIG. 1, and showing the movable valve member in said other position thereof, and showing additional portions of the cooling system within which the automotive thermostatic valve is secured.

The peripheral part of the annular body 28 of elastomeric material has an annular securing portion 42, which has upper and lower annular protuberances 42a and 42b, respectively, shown in FIG. 1. FIG. 1 shows the annular securing portion 42 in a relaxed condition with the annular protuberances 42a and 42b in a relaxed condition. The annular securing portion 42 is adapted to be clamped between conduit walls, such as conduit walls 43 and 44, shown in FIG. 3. FIG. 3 shows the annular securing portion 42 in a clamped condition, with the annular protuberances 42a and 42b in a compressed condition. The annular securing portion 42 of the annular body 28 of elastomeric material is adjacent the cylindrical reinforcing portion 14f of the rigid frame 14. Therefore, the annular securing portion 42 of the annular body 28 of elastomeric material is firmly reinforced and supported to provide rigidity to the annular securing portion 42, while maintaining the resilient characteristics of the elastomeric material. The annular protuberances 42a and 42b of the annular securing portion 42 assist in sealing action with respect to the conduit walls 43 and 44. Therefore, as shown in FIG. 3, the stationary valve member 10 is sealingly secured within a cooling system without the use of a gasket or the like.

The central annular portion 14a of the rigid frame 14 is shown as being angularly inclined with respect to the spokes 14c and supports a thermally responsive actuator member 46 which may be of any suitable type, such as, for example, the type shown in U.S. Pat. Nos. 2,806,375 and 2,806,376.

A helical spring 50 encompasses the thermally responsive actuator member 46 and joins the thermally responsive actuator member 46 to a connector member 52, which is engaged by the helical spring 50. The connector member 52 extends through the fluid port formed by the annular body 28 of elastomeric material and has a part 52a encompassing an actuator stem 56 of the thermally responsive actuator member 46. The part 52a is engaged by a helical spring 58 which encompasses the actuator stem 56 and engages an arm 60 which is joined to the actuator stem 56 by a nut 61. The arm 60 extends from the actuator stem 56 and is joined to a cylindrical movable valve member 72, which has an open upper-end 74 and an annular closure portion 75 at the lower part thereof. The cylindrical movable valve member 72 is in slidable engagement with an annular sealing member 77 which is carried by a horizontal wall 76 and is encompassed thereby.

As shown in FIG. 1, the annular closure portion 75 of the cylindrical movable valve member 72 normally seats upon the annular valve seat surface 34 of the annular body 28 of elastomeric material. Due to the fact that the annular valve seat surface 34 is adjacent and is supported by the annular support portion 14e of the rigid frame 14, the annular valve seat surface 34 has firm support while retaining the resilient characteristics of the elastomeric material of the annular body 28. The annular valve seat surface 34 thus is firmly supported when the annular closure portion 75 of the cylindrical movable valve member 72 is in engagement with the annular valve seat surface 34. However, the resilient characteristics of the annular valve seat surface 34 are maintained.

OPERATION

The automotive thermally responsive fluid control valve illustrated herein is of the type referred to as a by-pass valve device. However, other types of automotive thermally responsive fluid control valves may include stationary valve seat structure constructed in accordance with this invention. With regard to the valve device shown and described herein, fluid flows upwardly through the fluid port formed by the annular body 28 of elastomeric material, as illustrated by arrows 82. When the fluid which engages the thermally responsive actuator member 46 is below a predetermined temperature, fluid flow occurs through the valve device from the bottom to the top thereof, as illustrated by an arrow 84 in FIG. 1, and fluid flows from the valve device outwardly through the open upper-end 74 of the cylindrical movable valve member 72, between the open upper-end 74 and a conduit wall 90. The fluid flows into a passage formed between the horizontal wall 76 and the conduit wall 90.

Some of the fluid which flows upwardly through the valve device engages the thermally responsive actuator member 46. When the fluid which engages the thermally responsive actuator member 46 reaches a given predetermined temperature, the thermally responsive actuator member 46 responds, and the actuator stem 56 moves upwardly. Thus, the connected memer 52 and the cylindrical movable valve member 72 are moved upwardly, as illustrated in FIG. 3. Such upward movement is against the forces of the helical spring 50.

As the cylindrical movable valve member 72 moves upwardly, as shown in FIG. 3, the annular closure portion 75 thereof leaves the annular valve seat surface 34 and moves upwardly from the annular body 28 of elastomeric material, permitting fluid flow between the annular body 28 and the horizontal wall 76, as illustrated by an arrow 94 in FIG. 3. The maximum movement of the cylindrical movable valve member 72 from the annular body 28 of elastomeric material occurs when the open upper-end 74 of the cylindrical movable valve member 72 engages the conduit wall 90, as illustrated in FIG. 3. When the upper-end 74 of the cylindrical movable valve member 72 engages the conduit wall 90, the upper-end 74 is closed and all of the fluid flowing through the stationary valve member 10 also flows therefrom between the conduit walls 43 and 76, as illustrated by the arrow 94 in FIG. 3. When the cylindrical movable valve member 72 initially moves from the position thereof shown in FIG. 1 to the position thereof shown in FIG. 3, there is fluid flow from the upper-end 74 as illustrated by the arrow 84, and there is also fluid flow between the annular body 28 of elastomeric material and the annular closure portion 75, as illustrated by the arrow 94 in FIG. 3.

Due to the fact that the annular valve seat surface 34 is of elastomeric material, excellent sealing occurs between the annular closure portion 75 and the annular valve seat surface 34 when the annular closure portion 75 is seated upon the annular valve seat surface 34. Also, due to the fact that the annular securing portion 42 of the annular body 28 is of elastomeric material, excellent sealing occurs between the annular body 28 and the conduit walls 43 and 44, between which the stationary valve member 10 is secured, as shown in FIG. 3.

In summary, the annular body 28 of elastomeric material is produced without machining and is accurately and precisely formed upon the rigid frame member 14 by a molding process. The annular valve seat surface 34 and the annular securing portion 42 of the annular body 28 of elastomeric material are accurately formed with respect to all other portions of the stationary valve seat member 10. The rigid frame 14 provides rigid support to the thermally responsive actuator member 46 and also provides rigid support and reinforcement to the annular valve seat surface 34 and to the annular securing portion 42 of the annular body 28 of elastomeric material. Thus, the stationary valve seat member 10 is precisely and rigidly produced relatively inexpensively.

Due to the fact that the body 28 of elastomeric material is lighter in weight than a comparable body of metal material, a thermostatic fluid control valve device of this invention is lighter in weight than other valve devices of comparable physical size.

Although the preferred embodiment of the automotive thermostatic valve of this invention has been described, it will be understood that within the purview of this invention various changes may be made in the form, details, proportion and arrangement of parts, the combination thereof, and the mode of operation, which generally stated consist in an automotive thermostatic valve within the scope of the appended claims.

The invention having thus been described, the following is claimed:

1. An automotive thermostatic fluid control valve adapted for use in an engine coolant system, comprising a stationary valve member including a sheet metal member having an inner portion integrally connected to an outer annular portion by angularly arranged spoke portions defining coolant flow passages therebetween, said outer annular portion of said sheet metal member including a generally cylindrical reinforcing portion, a body of elastomeric material covering said outer annular portion of said sheet metal member and bonded to said cylindrical portion, said body of elastomeric material including a seat portion forming an annular valve seat, a movable valve member engageable with said annular valve seat, a thermally responsive actuator supported by said inner portion of said sheet metal member, means connecting the thermally responsive actuator to said movable valve member for moving said movable valve member axially relative to said annular valve seat in response to changes in temperature of the coolant, said generally cylindrical portion of said sheet metal member reinforcing said body of elastomeric material and supporting portions thereof for clamping the stationary valve member between components of the engine coolant system without the use of a gasket, and said outer annular portion of said sheet metal member having a support portion adjacent said seat portion of the body of elastomeric material and forming a support for said seat portion of said body of elastomeric material.

2. An automotive thermostatic fluid control valve adapted to be positioned between conduit components in an engine coolant system, comprising a stationary valve member including a sheet metal member having an inner portion integrally connected to an outer annular portion by angularly arranged spoke portions defining coolant flow passages therebetween, said outer annular portion of said sheet metal member including a generally cylindrical reinforcing portion, a body of elastomeric material covering said outer annular portion of said sheet metal member and bonded to said generally cylindrical reinforcing portion, said body of elastomeric material including a seat portion forming an annular valve seat and an annular flange encompassing the annular valve seat, the annular flange having an inner wall surface, a movable valve member engageable with said annular valve seat, the movable valve member being closely encompassed by the inner wall surface of the annular flange when the movable valve member is in engagement with said annular valve seat surface, a thermally responsive actuator supported by said inner portion of said sheet metal member and responsive to changes in temperature of coolant in the coolant system, means connecting the thermally responsive actuator to said movable valve member for moving said movable valve member axially relative to said annular valve seat in response to changes in temperature of the coolant which engages the thermally responsive actuator, the body of elastomeric material having a securing portion adjacent the cylindrical portion of the sheet metal member, said generally cylindrical portion of said sheet metal member reinforcing the securing portion of said body of elastomeric material and supporting the securing portion for clamping the securing portion of the body of elastomeric material between conduit components of the engine coolant system without the use of a gasket, and said outer annular portion of said sheet metal member having an annular support portion adjacent said seat portion and forming a support for said seat portion of said body of elastomeric material.

3. An automotive thermostatic fluid control valve adapted for use in an engine coolant system, comprising a stationary valve member including a sheet metal member having an inner part and an outer annular part, the inner and outer parts of the sheet metal member being integrally connected by angularly arranged spoke portions defining coolant flow passages therebetween, said outer annular part of said sheet metal member including an annular support portion and a generally cylindrical reinforcing portion, a body of elastomeric material covering said outer annular part of said sheet metal member and bonded thereto, said body of elastomeric material including a generally radially extending annular seat portion adjacent the annular support portion of the outer annular part of the sheet metal member, the body of elastomeric material having a securing portion adjacent the generally cylindrical reinforcing portion of the outer annular part of the sheet metal member, a movable valve member engageable with said valve seat portion, a thermally responsive actuator supported by said inner portion of said sheet metal member and including means connected to said movable valve member for moving said movable valve member axially relative to said valve seat portion in response to changes in temperature of coolant in the coolant system, said generally cylindrical portion of said sheet metal member reinforcing said body of elastomeric material and providing for clamping the stationary valve member between two components of the engine coolant system without the use of a gasket, and the annular support portion of the outer annular portion of said sheet metal member supporting the seat portion of said body of elastomeric material.

4. An automotive thermostatic valve of the type adapted to be positioned within a coolant system and provided with a stationary valve member, a movable valve member engageable with the stationary valve member and linearly movable with respect thereto, thermally responsive actuator means, and means joining the thermally responsive actuator means to the movable valve member for movement thereof, the improvement wherein the stationary valve member comprises a rigid frame element provided with an annular central portion and an annular outer portion, the annular portions being joined by a plurality of connecting members, a body of elastomeric material in covering relationship to the annular outer portion, the body of elastomeric material having an annular wall parallel with the line of movement of the linearly movable valve member, the body of elastomeric material also having an annular shoulder encompassed by the annular wall and forming an annular valve seat surface normal to the annular wall, the annular valve seat surface being abuttingly engageable by the movable valve member as the movable valve member seats upon the annular valve seat surface, the movable valve member being in slidable engagement with the annular wall as the movable valve member seats upon the annular valve seat surface, the annular outer portion of the rigid frame element having an annular support part adjacent the annular shoulder of the body of elastomeric material and forming a support for the annular shoulder and the annular valve seat surface, the outer annular portion of the rigid frame element also having a cylindrical part, the body of elastomeric material having a securing portion which covers the cylindrical part of the rigid frame element, the securing portion being adapted to be clamped between two parts of a coolant system, the cylindrical part of the rigid frame element reinforcing the securing portion to strengthen the securing portion during clamping thereof.

5. An automotive thermostatic valve of the type adapted to be positioned within a fluid cooling system and provided with a stationary valve member and a movable valve member, thermally responsive actuator means, and connector means joining the stationary valve member and the movable valve member for movement of the movable valve member with respect to the stationary valve member, the improvement wherein the stationary valve member comprises a rigid frame member, the rigid frame member having an annular support portion and a cylindrical support portion, an annular body of elastomeric material covering the annular support portion and the cylindrical support portion of the rigid frame member, the annular body of elastomeric material having an annular shoulder portion adjacent the annular support portion of the rigid frame member and providing a valve seat surface abuttingly engageable by the movable valve member, the body of elastomeric material also having an annular peripheral securing portion adjacent the cylindrical support portion of the rigid frame member, the cylindrical support portion supporting and reinforcing the securing portion as the securing portion is secured within a fluid cooling system.

6. An automotive thermostatic fluid control valve adapted for use in an engine coolant system, comprising a stationary valve member including a sheet metal member having an inner portion integrally connected to an outer annular portion by spoke portions defining coolant flow passages therebetween, said outer annular portion of said sheet metal member including a generally cylindrical reinforcing portion, a body of elastomeric material covering said outer annular portion of said sheet metal member and bonded to said cylindrical portion, said body of elastomeric material including a seat portion forming an annular valve seat, a movable valve member engageable with said annular valve seat, a thermally responsive actuator supported by said inner portion of said sheet metal member, means connecting the thermally responsive actuator to said movable valve member for moving said movable valve member axially relative to said annular valve seat in response to changes in temperature of the coolant, said generally cylindrical portion of said sheet metal member reinforcing said body of elastomeric material and supporting portions thereof for clamping the stationary valve member between components of the engine coolant system without the use of a gasket.

* * * * *